March 24, 1970 W. GROEMMINGER, JR 3,501,975

BOWDEN WIRE SWITCH OPERATING MECHANISM

Filed Sept. 25, 1968

INVENTOR
WILLIAM GROEMMINGER, JR.

BY Cyril A. Krenzer
ATTORNEY

United States Patent Office 3,501,975
Patented Mar. 24, 1970

3,501,975

BOWDEN WIRE SWITCH OPERATING MECHANISM

William Groemminger, Jr., Fairport, N.Y., assignor to Sylvania Electric Products Inc., a corporation of Delaware Filed Sept. 25, 1968, Ser. No. 762,494
Int. Cl. F16c *1/10*
U.S. Cl. 74—501 6 Claims

ABSTRACT OF THE DISCLOSURE

A Bowden wire arrangement is utilized to operate a gang of switches on a television chassis, means being provided to enable quick and easy attachment and detachment of the Bowden wire arrangement from the chassis, replacement of the Bowden wire arrangement being made without disturbing initial adjustment of parts.

BACKGROUND OF THE INVENTION

This invention relates to mechanical switch operating mechanism and is particularly intended for use where remote switching is required and the use of relays would be inhibited either because of the cost of the relays or because the electrical noise created by relay operation would cause undesirable effects on the apparatus controlled by the relay. As an example, the switches controlled may be those on a television chassis where electrical noise due to relay operation may cause visible effects on the picture screen.

OBJECTS AND SUMMARY OF THE INVENTION

It is an object of this invention to provide a mechanical drive for a switch or gang of switches wherein parts may be easily connected and disconnected from each other so as to permit ease in servicing of the apparatus on which the switch is mounted.

It is a further object of the invention to provide means associated with the switch operating mechanism to ease the force required to operate it.

A still further object of the invention is to provide in a Bowden wire operating mechanism having a knob attached to the wire, means to adjust the pull out clearance of the knob with respect to the covering within which the wire is sheathed.

It is yet another object of this invention to provide a quick connect and disconnect means of the switch operating mechanism which will retain the factory adjustment of parts after reconnection.

According to one aspect of the invention, a switching mechanism is located on the chassis of a receiver proximate the switched circuits to minimize stray capacity and noise pickup. A Bowden wire arrangement provides mechanical coupling between the switching mechanism and an on/off knob external to cabinet containing the chassis. The Bowden wire arrangement is secured to the switching mechanism in a manner which facilitates quick and easy attachment and detachment therebetween.

DESCRIPTION OF THE PREFERRED EMBODIMENT

Figure 1:
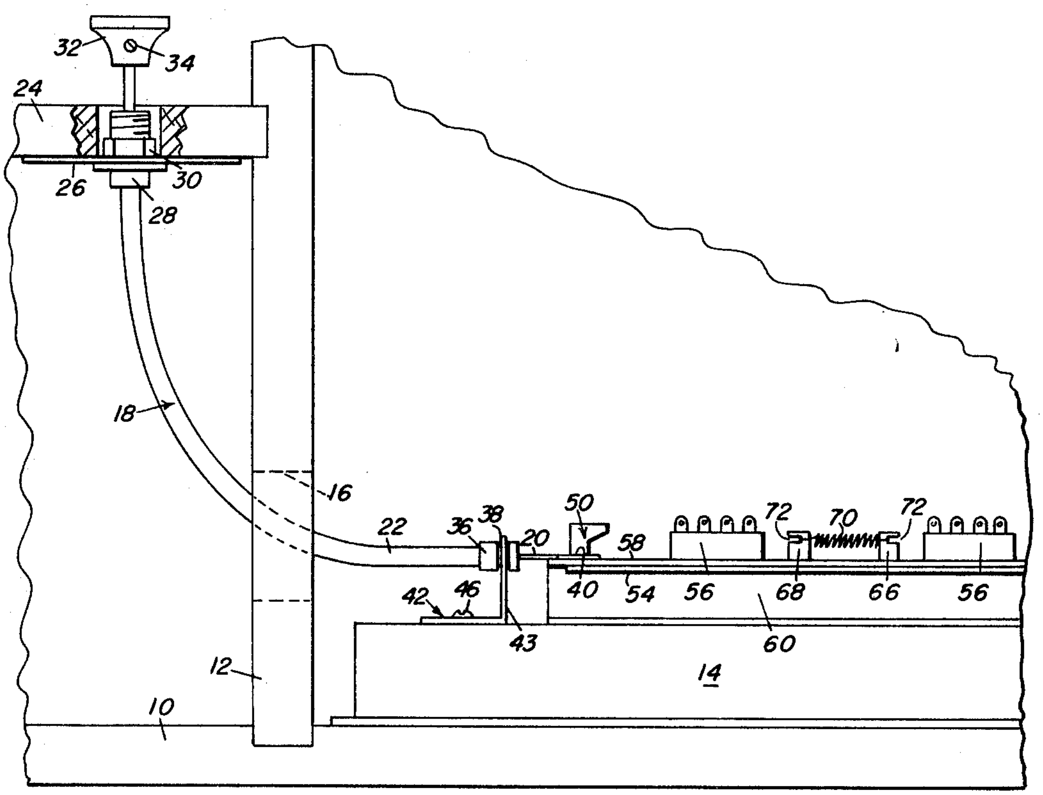
FIG. 1 shows an elevational view of an application of the invention to a cabinet containing a television chassis.
Figure 2:
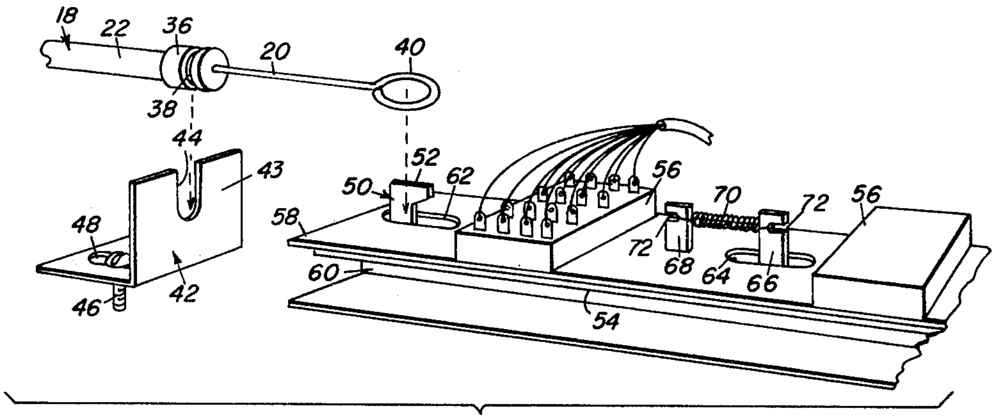
FIG. 2 is a fragmentary perspective view showing the Bowden wire and sheath disconnected from the switch and from an associated sheath support element.

For a better understanding of the present invention, together with other and further objects, advantages and capabilities thereof, reference is made to the following disclosure and appended claims in connection with the above-described drawings.

Now referring to the drawings in greater detail, at 10 is shown the bottom shelf of a cabinet for housing, to the right of a vertical partition wall 12, the chassis 14 of a television set and any desired other equipment. To the left of the partition wall is housed other equipment associated with the television equipment but which need not be described herein. In the partition wall is a slot 16 for the passage therethrough of a Bowden wire arrangement 18 comprised of a stiff wire 20 and a sheath 22 through which the wire may be pushed or pulled. The Bowden wire 20 extends at one end to a cabinet deck 24 and the sheath is fastened to the undersurface of the deck by conventional means, as by a plate 26 fastened by screws to the underface of the deck through which a threaded and flanged collar 28 passes, a nut 30 threaded on the collar holding the sheath to the plate. To the upper end of the wire is fastened an operating knob 32 as by a screw fastening 34.

The lower end of the sheath, which may be made of metal, is provided with a sleeve 36 fastened to the sheath as by brazing it thereto, the sleeve being provided with a circumferential groove 38. The lower end of the stiff wire is finished off into a loop 40.

Mounted on a fixed part of the chassis is a right angular plate 42 having a vertical wall 43 whose upper edge is notched as indicated at 44 to snugly accommodate the sleeve 36 with the groove 38 fitting into the notch. Due to the curvature of the Bowden wire arrangement and its stiffness the sleeve is urged into coupling engagement with the plate but yet can be easily disconnected therefrom by merely pulling up on the sheath to the left of the plate.

The foot of the plate is fastened to the chassis by screws 46 passing through slots 48 in the foot of the plate to provide for adjustment of the plate to and from a switch slide operating lug 50 having a nose 52. The lug 50 is secured to an insulating slide 54 carrying switch elements which cooperate with gang switches 56 mounted on a fixed slide supporting sheet 58 fixed to an H-bar 60 in turn fastened to the chassis, so that as the slide 54 is shifted longitudinally, different circuits are established in the gang switches 56. The sheet 58 is longitudinally slotted as indicated at 62 to allow for longitudinal displacement of the lug 50 and is provided with an additional slot 64 to enable longitudinal movement of a second lug 66 also fastened to the slide 54. Fixed to the sheet 58 and in between the lugs 50 and 66 is a third lug 68. Stretched between lugs 66 and 68 is a coil spring 70 conveniently secured to the lugs as by engagement in slots 72 therein. The loop 40 is looped over the nose 52 of the lug 50 and when the knob 32 of the Bowden wire arrangement is pulled, the slide 54 is shifted to the left establishing certain switch arrangements. Meantime, the stress on the spring 70 is increased but not sufficiently, due to frictional engagement of parts, to cause any displacement of the wire 20 or movement of the slide. However, the spring pull does assist the operator in moving the slide 54 to the right and in effecting downward movement of the knob. The operator appears to sense the same effort in shifting the knob when pulling on the knob as when he presses down on the knob, possibly because he pulls up on the knob with two fingers straddling the underside of the knob and pushes down on the knob with his thumb pressing down on the top face of the knob.

By reason of the adjustment provided by the slots 48 in angular plate 42, it is possible to adjust the position of the sheath 22 relevant to the lug 50 thereby altering the length of wire 20 extending between the sheath and the lug 50 and thus the length of wire 20 between the threaded collar 28 and the knob 32. Thereby the height of the knob 32 relative to the cabinet deck 24 may be predetermined for a particular position of the switch operating slide 54.

Should servicing of the television chassis be required, it can easily be disconnected from the Bowden wire arrangement by disconnecting the sleeve 36 from the notched plate 42 and by detaching loop 40 from the nose of lug 50. Reverse movement of parts re-establishes connection of the Bowden wire arrangement to the chassis without requiring readjustment of parts.

While there has been shown and described what is at present considered the preferred embodiment of the invention, it will be obvious to those skilled in the art that various changes and modifications may be made therein without departing from the scope of the invention.

I claim:

1. Means for positioning the operating member of a switch mechanism comprising a loop engageable member fixed on the operating member, a fixedly positioned vertical wall having a notch in the upper edge thereof, a Bowden wire arrangement having a sheath and a stiff wire within the sheath, the stiff wire at its one end having a loop engageable with the loop engageable member, the sheath adjacent the loop having a grooved collar fixed to the sheath with the groove in the collar fitted into the notch of the vertical wall, the opposite end of the sheath being fixed to a support and the wire adjacent the opposite end of the sheath being equipped with a wire pushing and pulling element, the Bowden wire arrangement between the support and the vertical wall being slack to provide for ease in disconnecting the Bowden wire arrangement from the vertical wall and from the operating member of the switch.

2. The structure of claim 1 wherein the vertical wall is adjustable relative to the operating member of the switch mechanism.

3. The structure of claim 1 wherein the Bowden wire arrangement is bowed in a direction toward the notch in the vertical wall.

4. The structure of claim 1 wherein the operating member of the switch is a lug with a nose portion engaged by the loop of the stiff wire of the Bowden wire arrangement.

5. The structure of claim 1 wherein the operating member is a lug on the slide of a slide switch.

6. The structure of claim 1 wherein there is provided a cabinet with a slotted vertical partition and a horizontal deck on one side of the partition with a television chassis in the cabinet on the other side of the partition, the television chassis supporting the switch mechanism and also the notched vertical wall, the Bowden wire arrangement passing through the slot in the partition wall with an upper end of its sheath attached to the deck, the Bowden wire arrangement being bowed in the direction of the notch in the vertical wall.

References Cited

UNITED STATES PATENTS

| | | | |
|---|---|---|---|
| 1,204,625 | 11/1916 | Wheelock | 248—56 XR |
| 1,876,731 | 9/1932 | Neate | 74—501 |
| 2,893,419 | 7/1959 | Coulter | 74—501 XR |
| 2,966,969 | 1/1961 | Morse | 74—501 XR |
| 3,150,539 | 9/1964 | Wallis | 74—501 |
| 3,319,912 | 5/1967 | Crowther | 74—501 XR |

FRED C. MATTERN, JR., Primary Examiner

MANUEL A. ANTONAKAS, Assistant Examiner

U.S. Cl. X.R.

16—2